United States Patent
Eom

(10) Patent No.: US 8,792,734 B2
(45) Date of Patent: Jul. 29, 2014

(54) APPARATUS AND METHOD FOR TRANSMITTING/RECEIVING IMAGE DATA IN MOBILE COMMUNICATION SYSTEM

(75) Inventor: Su-Hyung Eom, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 3309 days.

(21) Appl. No.: 11/249,641

(22) Filed: Oct. 13, 2005

(65) Prior Publication Data
US 2006/0087687 A1    Apr. 27, 2006

(30) Foreign Application Priority Data
Oct. 27, 2004   (KR) .................. 10-2004-0086385

(51) Int. Cl.
G06K 9/36    (2006.01)
(52) U.S. Cl.
USPC .......... 382/232; 382/254; 382/275; 375/240; 375/240.01; 375/240.12; 375/240.13; 348/14.01; 348/14.12; 348/14.15

(58) Field of Classification Search
None
See application file for complete search history.

(56) References Cited

U.S. PATENT DOCUMENTS

| | | | |
|---|---|---|---|
| 5,510,839 A * | 4/1996 | Hamano et al. .......... | 375/240.16 |
| 5,528,284 A | 6/1996 | Iwami et al. | |
| 5,627,590 A * | 5/1997 | Hamano et al. .......... | 375/240.13 |
| 5,844,628 A * | 12/1998 | Hamano et al. .......... | 348/616 |
| 6,611,561 B1 * | 8/2003 | Hannuksela et al. ..... | 375/240.27 |
| 6,658,153 B1 * | 12/2003 | Nakagawa et al. ....... | 382/233 |
| 7,099,352 B1 * | 8/2006 | Ferguson et al. ......... | 370/504 |
| 7,570,667 B1 * | 8/2009 | Ferguson et al. ......... | 370/504 |

FOREIGN PATENT DOCUMENTS

| | | |
|---|---|---|
| CN | 1340275 | 3/2002 |
| GB | 2 347 038 | 8/2000 |
| WO | WO 00/49810 | 8/2000 |

* cited by examiner

Primary Examiner — Matthew Bella
Assistant Examiner — Jason Heidemann
(74) Attorney, Agent, or Firm — The Farrell Law Firm, P.C.

(57) ABSTRACT

Disclosed is a method and apparatus for transmitting/receiving image data in a mobile communication system, in which image data are classified into two types of image data, a first type of image data corresponding to entire-image data in a current time period, a second type of image data being image data representing a difference between previous time-period image data and current time-period image data. A transmission side transmits image data to a reception side, and the reception side notifies the reception side of error occurrence of received image data when detecting the error occurrence on the received image data. When receiving the notification of the error occurrence, the transmission side generates the first type of image data and transmits the first type of image data to the reception side. The reception side receives generated the first type of image data from the transmission side and decodes the first type of image data.

6 Claims, 4 Drawing Sheets

APPARATUS AND METHOD FOR TRANSMITTING/RECEIVING IMAGE DATA IN MOBILE COMMUNICATION SYSTEM

PRIORITY

This application claims to the benefit under 35 U.S.C. 119(a) of an application entitled "Apparatus And Method For Transmitting/Receiving Image Data In Mobile Communication System" filed in the Korean Intellectual Property Office on Oct. 27, 2004 and assigned Ser. No. 2004-86385, the entire contents of which are incorporated herein by reference.

BACKGROUND OF THE INVENTION

1. Field of the Invention

The present invention relates to a wireless communication system capable of transmitting/receiving image data, and more particularly to an apparatus and method for efficiently transmitting/receiving image data when an error occurs during transmission/reception of the image data.

2. Description of the Related Art

In wireless communication, the first-generation (IG) communication system employs an analog scheme, and the second-generation (2G) wireless communication system employs a digital scheme in which relatively low-speed data including voice is transmitted on a wireless network. The second generation (2G) wireless-based communication system has evolved into the current third-generation (3G) communication system which provides high-speed Internet and multimedia service based on wire/wireless integration technology. Furthermore, communication systems are currently evolving from the third generation mobile communication system, known as "International Mobile Telecommunication (IMT)-2000" to a fourth-generation mobile communication system having characteristics of being ultra-high speed, handling a large quantity of data and mobility. With such development in the mobile communication system, it becomes possible for current mobile communication systems to provide multimedia service as well as voice service, contrary to the conventional mobile communication system providing only voice service.

The multimedia service provided to users can handle video data, audio data and especially, image data, which include a great amount of data. For this reason, various methods for transmitting image data are being proposed. The transmission of the image data will be described hereinbelow with reference to a typical Wideband Code Division Multiple Access (WCDMA) system, from among mobile communication systems providing the multimedia service, as an example.

The WCDMA system employs the H.324M standard in order to perform image communication, i.e., to transmit/receive the image data. The H.324M standard refers to moving-picture communication including video, audio, etc. in a wireless channel. The recommended standard for H.324M includes the H.223 standard in relation to multiplexing, the H.263 standard for encoding video signals, the MPEG-4 (Moving Picture Experts Group standards 4), an Audio/Modem Riser (AMR) for encoding audio signals, a G.723.1 voice encoder, and the H.245 standard for encoding control data. In addition, video, audio and control data are encoded by using the above-mentioned standards, and then the encoded data are multiplexed/demultiplexed in a protocol data unit (PDU) according to the H.223 standard which is a standard for multiplexing. Before a multiplexing procedure in a PDU is performed, a sequential number and a cyclic redundancy check (CRC) for detecting an error occurring in a data transmission procedure according to the H.223 standard is applied in an adaptation layer. When a frame generated according to the H.223 standard is demultiplexed, it is determined if there is an error by using the sequential number and the CRC included in the frame.

A WCDMA system transmitting/receiving image data using the H.324M standard as described above includes user equipments (UEs) for transmitting/receiving the image data, a serving node B for providing service to the UEs, and a plurality of neighbor node Bs. In addition, communication routes for performing data communication through the node B are secured between the UEs, and an image data service is provided through the communication routes.

The WCDMA system currently uses I frames and P frames in order to transmit/receive the visual image. A procedure for transmitting/receiving image data by using such image frames will now be described with reference to FIG. 1. FIG. 1 is a flow diagram schematically illustrating a procedure for transmitting/receiving image data in a typical WCDMA system.

An I frame is a whole image frame having data for an entire-image (i.e., information about one entire image for reproduction of image data) when image data are transmitted. Therefore, when using such an I frame, the UE can reproduce one entire image. However, the I frame includes a great amount of data. Therefore, not just the I frames are transmitted, but a predetermined number of P frames are transmitted between the I frames. That is, data for a partial image, i.e., compressed data for reproducing image data, is transmitted between the I frames. The compressed data includes information about a changing portion as compared with a previously-reproduced image, which is called a 'P frame'. When the UE receives the P frame, the UE reproduces an image by applying the change of an image included in the received P frame to a previously-reproduced image.

As described above, in the current WCDMA system, information about the image change is transmitted by interposing and transmitting the P frame between the I frames transmitted at a predetermined interval. This method is employed to decrease the transmission/reception quantity of large-scale image data and to increase a transmission efficiency.

In FIG. 1, the WCDMA system includes 'UE 1' 100 and 'UE 2' 150, in which a procedure for transmitting image data from 'UE 1' 100 to 'UE 2' 150 is shown. In 'UE 1' 100, image data are subjected to an encoding procedure by an encoder 110. The image data having been subjected to the encoding procedure are processed according to the H.324M standard. Image frames, i.e., I frames and P frames, generated with the image data are multiplexed and transmitted to a wireless network. First, 'UE 1' 100 transmits an I frame 101 for reproducing image data, and then 'UE 2' 150 receives the I frame 101 in accordance with the H.324M standard. Thereafter, 'UE 2' 150 performs a demultiplexing procedure for the received I frame 101 and checks if corresponding image data include an error. In this case, 'UE 2' 150 checks if there is an error in the received image data by using CRC information and sequential number inserted in the transmission frame.

The image data are reproduced by a decoder 120 included in the 'UE 2' 150. After transmitting the I frame 101, 'UE 1' 100 transmits a P frame. In this case, the transmitted P frame includes information only about changes from a previous frame.

However, since data communication between 'UE 1' 100 and 'UE 2' 150 is performed through a wireless network, an error may occur in the image data due to various factors, such as attenuation and distortion of a signal, noise, etc., in the wireless network. In this case, 'UE 2' 150 receiving the image data determines if there is a loss or an error in the image data. 'UE 2' 150 checks if there is a transmission error in the received image frames (i.e., I frame and P frame) by using the CRC information and the sequential number, and does not decode a corresponding image frame when there is a transmission error. When a P frame 103 transmitted from 'UE 1' 100 includes an error, 'UE 2' 150 does not perform a decoding procedure for the P frame 103. Thereafter, when 'UE 2' 150 receives the next P frame 105 having no error, the 'UE 2' 150 reproduces image data by decoding the P frame 105.

Then, 'UE 2' 150 checks if there is an error in the following image frames transmitted from 'UE 1' 100 for each of the image frames. When an error occurs in an image frame, the 'UE 2' 150 does not perform a decoding procedure for the relevant image frame. Therefore, if an error occurs in the P frame 103, the 'UE 2' 150 does not decode the P frame 103. Then, 'UE 2' 150 decodes the P frame 105 received after the P frame 103, if there is no error. In this case, since the received P frame 103 has not been decoded, an abnormal image is reproduced when the P frame 105 is received and reproduced, since the data from P frame 103 is missing.

Accordingly, when image data are transmitted using the above-mentioned conventional manner, image data may not be normally restored with only P frames which follow an image frame containing an error unless the entire-image frame (i.e., an I frame) is received. As a result, the conventional method has a problem in that an abnormal image is reproduced in a UE receiving the image data. In addition, when an error in image data occurs, a user of the relevant UE can not avoid viewing abnormal images when a P frame containing the error is received as compared to when an I frame is received.

SUMMARY OF THE INVENTION

Accordingly, the present invention has been made to solve the above-mentioned problems occurring in the prior art, and an object of the present invention is to provide an apparatus and method for transmitting/receiving image data in a mobile communication system.

Another object of the present invention is to provide an apparatus and method for efficiently transmitting/receiving image data when an error occurs during an image data transmitting/receiving procedure in a mobile communication system.

Still another object of the present invention is to provide an apparatus and method for efficiently transmitting/receiving image data so as to provide normal images to a user in a mobile communication system even in the event transmission/reception errors occur.

To accomplish these objects, in accordance with one aspect of the present invention, there is provided a method for transmitting/receiving image data in a mobile communication system, in which image data are classified into two types of image data, a first type of image data corresponding to entire-image data in a current time period, a second type of image data being image data representing only a difference between previous time-period image data and current time-period image data, the method including transmitting image data from a transmission side to a reception side; notifying the transmission side of an error when it is detected on the reception side that received image data has an error; receiving, on the transmission side, notification of error occurrence, generating the first type of image data, and transmitting the generated first type of image data to the reception side; and receiving, on the reception side, the generated first type of image data from the transmission side, and decoding the received first type of image data.

In accordance with another aspect of the present invention, there is provided a method for transmitting image data in a mobile communication system, in which image data are classified into two types of image data, a first type of image data corresponding to entire-image data in a current time period and a second type of image data being image data representing a difference between previous time-period image data and current time-period image data, the method includes transmitting image data to a reception side and then receiving notification of error occurrence of the image data from the reception side; and generating the first type of image data when receiving the notification of the error occurrence, and transmitting the generated first type of image data to the reception side.

In accordance with another aspect of the present invention, there is provided an apparatus for transmitting/receiving image data in a mobile communication system, in which image data are classified into two types of image data, a first type of image data corresponding to entire-image data in a current time period, a second type of image data being image data representing a difference between previous time-period image data and current time-period image data, the apparatus including a transmission apparatus for transmitting image data, generating the first type of image data when notification of error occurrence is received, and transmitting the generated first type of image data to the reception apparatus; and a reception apparatus for receiving the image data, notifying the transmission apparatus of the error occurrence of a received image data when an error is detected in the received image data, and decoding the generated first type of image data when the generated first type of image data are received from the transmission apparatus.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the embodiments of the present invention, a detailed description of known functions and configurations incorporated herein will be omitted when it may obscure the subject matter of the present invention.

Figure 1:
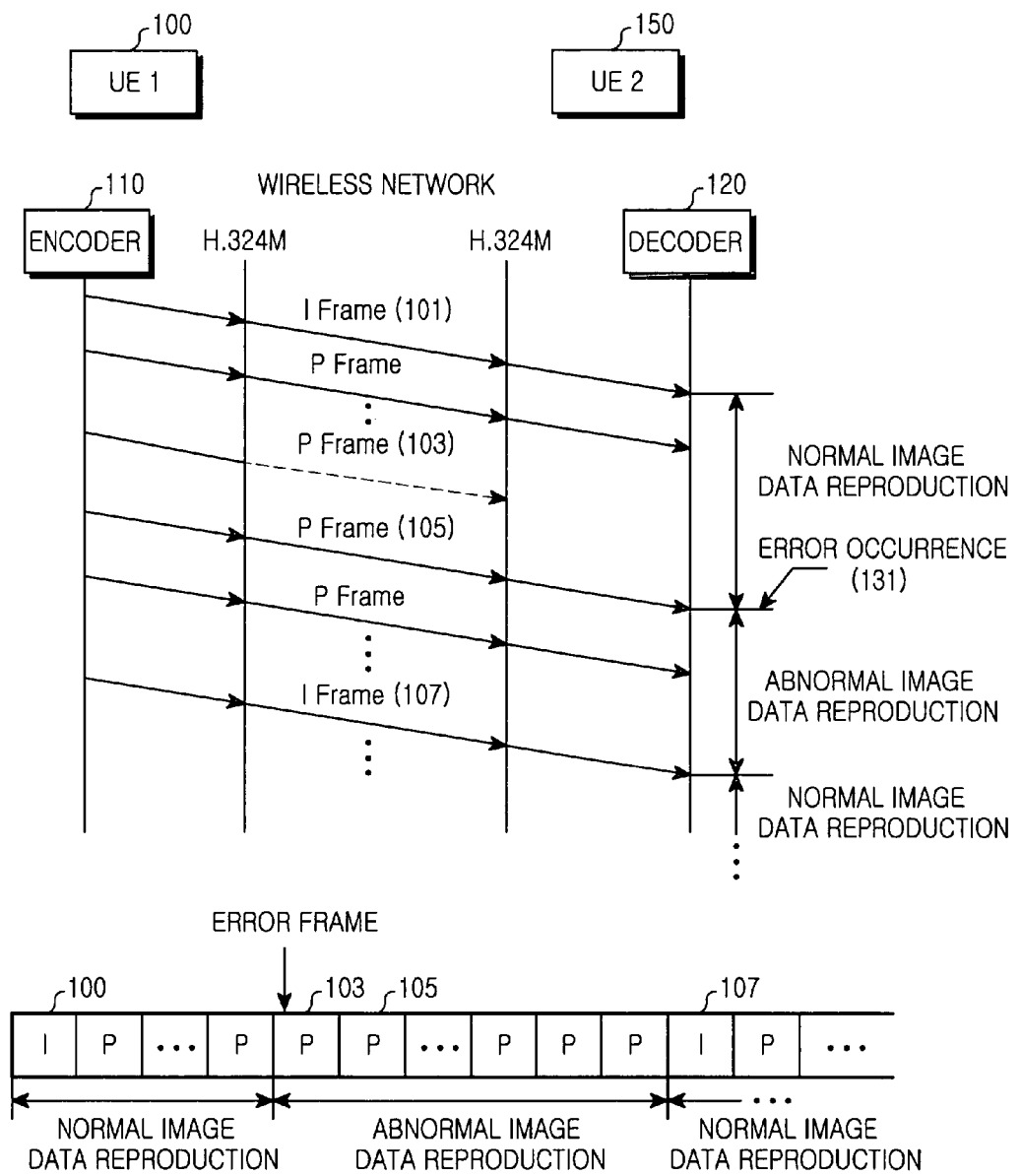
FIG. 1 is a flow diagram schematically illustrating a procedure for transmitting/receiving image data in a typical WCDMA system.
Figure 2:
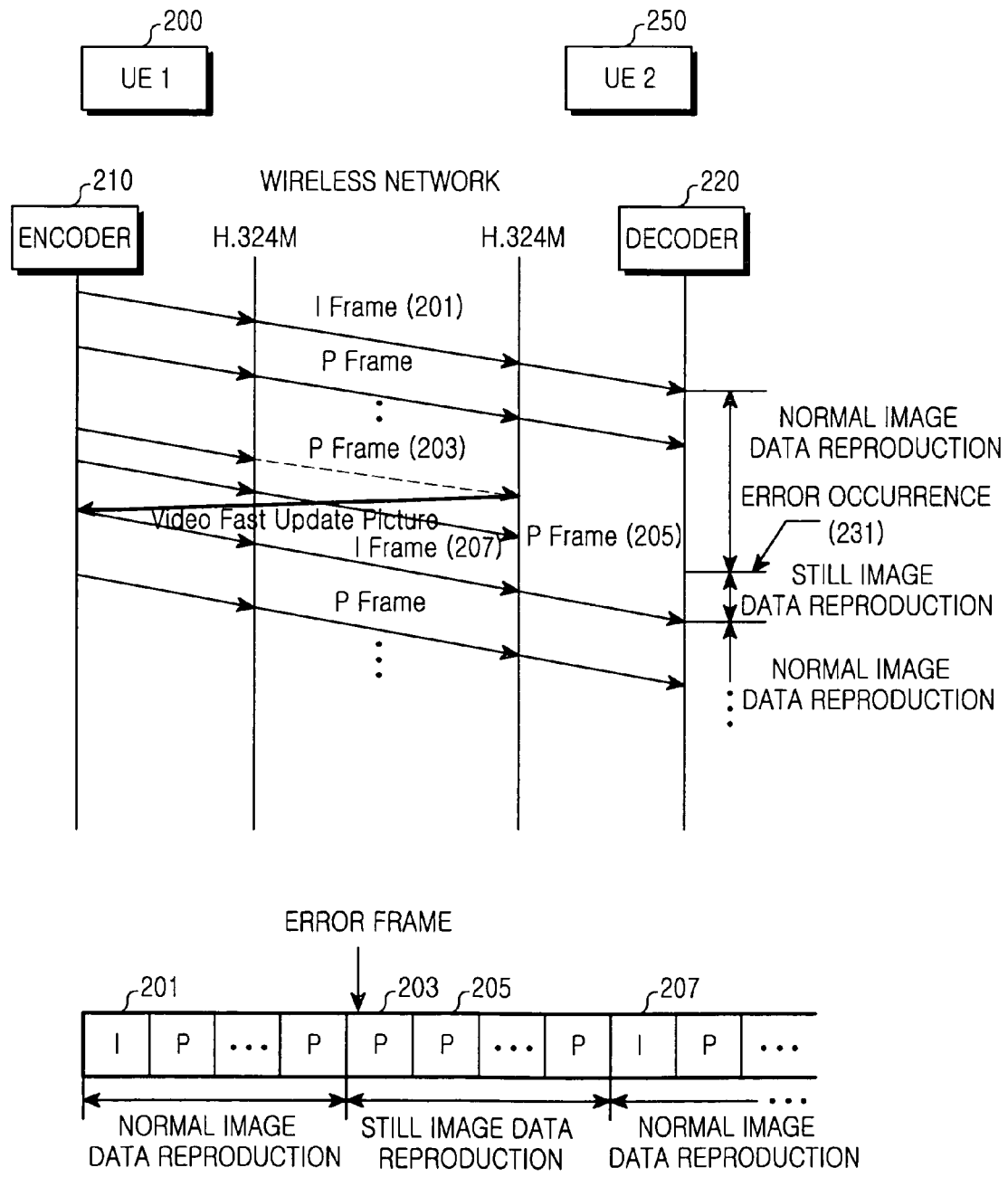
FIG. 2 is a flow diagram schematically illustrating a procedure for transmitting/receiving image data in a WCDMA system according to an embodiment of the present invention.

The present invention will be described with respect to a WCDMA system as an example, in which image data are transmitted/received according to the H.324M standard. The WCDMA system includes user equipments (UEs) for transmitting/receiving the image data, a serving node B for providing service to the UEs, and a plurality of neighbor node Bs. In addition, communication routes for performing data communication through the node B are provided between the UEs for transmitting/receiving the image data, and an image data service is provided through the communication routes. The WCDMA system uses I frames and P frames in order to transmit/receive the image data. FIG. 2 is a flow diagram of a procedure for transmitting/receiving image data in a WCDMA system according to an embodiment of the present invention. The WCDMA system includes 'UE 1' 200 and 'UE 2' 250, in which a procedure for transmitting/receiving image data from 'UE 1' 200 to 'UE 2' 250 is shown. In 'UE 1' 200, image data are subjected to an encoding procedure by an encoder 210. The image data, having been subjected to the encoding procedure, are processed according to the H.324M standard. Image frames (i.e., I and P frames) generated with the image data are multiplexed and transmitted to a wireless network. First, 'UE 1' 200 transmits an I frame 201 in order to reproduce image data. Then, 'UE 2' 250 receives the I frame 201 according to the H.324M standard. Thereafter, 'UE 2' 250 checks, through a demultiplexing procedure, if there is an error in the image data. In this case, an error in the image data is checked using CRC information and a sequential number inserted into the transmitted frame.

Then, the image data are reproduced through a decoder 220 in 'UE 2' 250. After transmitting the I frame 201, 'UE 1' 200 transmits a P frame. In this case, the P frame is transmitted between I frames transmitted at a predetermined interval and carries compressed partial-image data.

However, since data transmission between 'UE 1' 200 and 'UE 2' 250 is achieved through a wireless network, an error in the image data may occurs due to various factors, such as attenuation and distortion of a signal, a noise, etc., in the wireless network. Therefore, 'UE 2' 250, having received the image data, determines if there is a loss or an error in the received image data. 'UE 2' 250 checks if there is a transmission error in the received image frames (i.e., I frame and P frame) by using the CRC information and the sequential number, and does not decode the image frame if there is a transmission error. When an error 231 occurs in a P frame 203 transmitted from 'UE 1' 200, 'UE 2' 250 does not decode the P frame 203. Thereafter, although 'UE 2' 250 receives the next P frame 205 having no error, 'UE 2' 250 does not decode and apply the P frame 205.

Instead, 'UE 2' 250 transmits a VideoFastUpdatePicture message to 'UE 1' 200. Herein, the VideoFastUpdatePicture message refers to a message transmitted for an I frame request to 'UE 1' 200 transmitting the image data when an error occurs in a frame received to be decoded in 'UE 2' 250. When 'UE 1' 200 receives the VideoFastUpdatePicture message, 'UE 1' 200 stops transmitting image frames (P frames) currently in transmission and transmits an entire-image frame, i.e., an I frame.

In brief, when receiving an image frame having an error, 'UE 2' 250 transmits the VideoFastUpdatePicture message to 'UE 1' 200 to request the transmission of an I frame. Then, 'UE 1' 200 transmits an I frame 207 to 'UE 2' 250 regardless of the type of an image frame currently being transmitted.

In this case, 'UE 2' 250 does not perform the decoding procedure for the P frame 205 received before the reception of the I frame 207. Therefore, because the P frames have not been decoded, a still image is reproduced in 'UE 2' 250. However, due to the transmission of the VideoFastUpdatePicture message, the still image is shown only until an I frame is received. As a result, it is possible to reproduce normal image data with a shorter period of time than that required in the prior art employing only I frames.

Next, 'UE 2' 250 receives and reproduces the I frame 207 transmitted from 'UE 1' 200. Accordingly, when an error occurs in received image data, it is possible to reproduce normal image data only after a still image is reproduced in a very short time period.

In the above description, a procedure for reproducing the image data is described with respect to 'UE 1' 200 functioning as a transmission apparatus and 'UE 2' 250 finctioning as a receiving apparatus. However, it goes without saying that the operation for reproducing image data can be applied to all apparatuses having a transmission or reception function in a mobile communication system. The operations for transmitting/receiving image data will now be described in detail, in which 'UE 1' is employed as an apparatus for transmitting image data and 'UE 2' is employed as an apparatus for receiving and reproducing the image data, by way of example.

Figure 3:
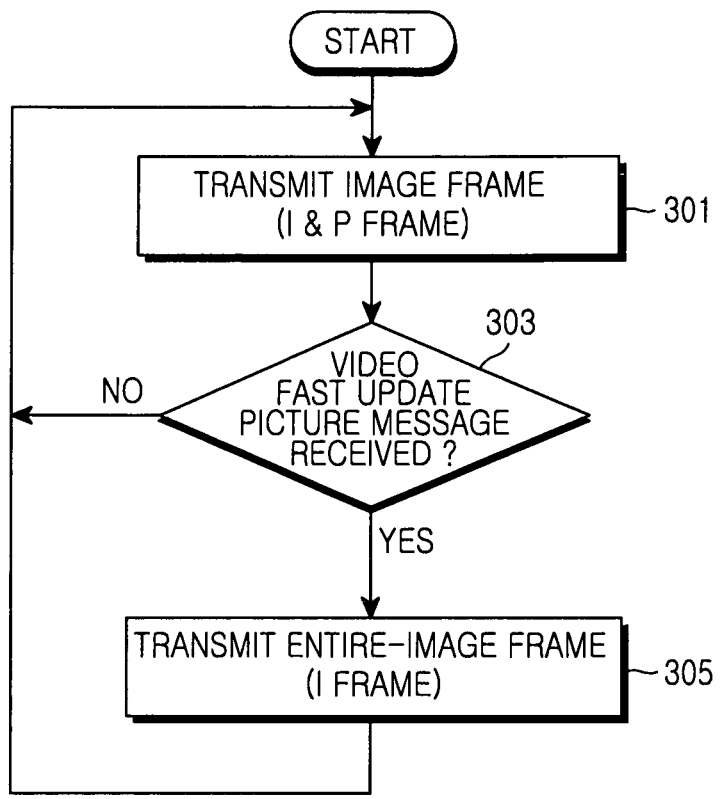
FIG. 3 is a flowchart of an operating procedure of an image data transmission apparatus in a WCDMA system according to an embodiment of the present invention.

FIG. 3 is a flowchart of the operating procedure of an image data transmission apparatus in a WCDMA system according to an embodiment of the present invention.

UE 1 transmits image data by transmitting I frames in a predetermined period of time. In addition, UE 1 inserts and transmits P frames between the I frames. That is, UE 1 transmits image frames (i.e., I and P frames) in step 301 according to an I and P frame transmission procedure employed in the WCDMA system. During the course of transmission of the image frames, UE 2 transmits a VideoFastUpdatePicture message to UE 1 when an error occurs in an image frame transmitted from UE 1, and UE 1 checks if the VideoFastUpdatePicture message is received in step 303. Herein, the VideoFastUpdatePicture message refers to a message where UE 2 requests the transmission of an I frame from UE 1. In this case, if UE 1 does not receive the VideoFastUpdatePicture message from UE 2, UE 1 transmits the next image frame in regular order according to the procedure of the system. In contrast, when UE 1 receives the VideoFastUpdatePicture message from UE 2, UE 1 transmits an I frame including an entire-image data in step 305.

That is, when receiving the VideoFastUpdatePicture message, UE 1 immediately performs the operation for the transmission of an I frame, so that it is possible to transmit a corresponding I frame as soon as an error occurs in a P frame.

Figure 4:
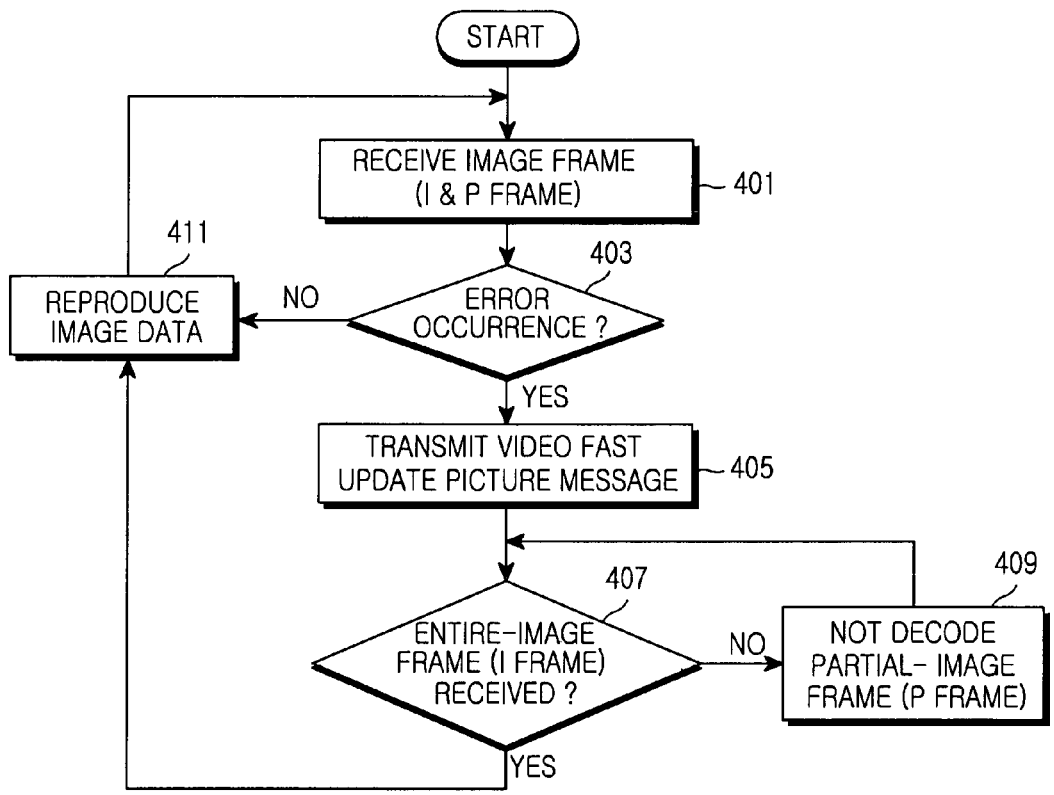
FIG. 4 is a flowchart of an operating procedure of an image data reception apparatus in a WCDMA system according to an embodiment of the present invention.

FIG. 4 is a flowchart of the operating procedure of an image data reception apparatus in a WCDMA system according to an embodiment of the present invention.

UE 2 receives an image frame from UE 1 in step 401. In step 403, UE 2 determines if there is an error in the received image frame. When there is no error in the received image frame, UE 2 decodes the received image frame and reproduces image data in step 411. In contrast, when an error occurs in the received image frame, UE 2 transmits the VideoFastUpdatePicture message to UE 1 transmitting the image frame in step 405. That is, UE 2 can request the transmission of an entire-image frame (i.e., an I frame) to UE 1 by transmitting the VideoFastUpdatePicture message. Next, UE 2 determines if an entire-image frame (i.e., an I frame) is received in step 407. In this case, if UE 2 receives not an I frame but a partial-image frame (i.e., a P frame), UE 2 does not decode and discards the received P frame in step 409, and the process return to step 407. Thereafter, the step of determining if UE 2 receives an I frame. As a result of the determination, when UE 2 receives an I frame is repeated, UE 2 uses the received I frame to reproduce image data in step 411. In order to perform such an operation, it is necessary for UE 2 to distinguish the types of frames, that is, to determine whether a received image frame is an I frame or a P frame.

According to the present invention, in the course of transmitting image frames to transmit/receive image data in a mobile communication system, when an error occurs in an image frame received in a reception apparatus, the reception apparatus notifies a relevant transmission apparatus of the error, and subsequently receives an entire image information to reproduce image data. Accordingly, although an error occurs in a received image frame, it is possible to continuously reproduce normal image data after a still image screen is displayed in a very short time period. In addition, the image data reproduction method according to the present invention enables a user to always watch a normal image, not an abnormal image provided by the conventional image data reproduction method.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for transmitting/receiving image data in a mobile communication system, in which image data are classified into two types of image data, a first type of image data corresponding to entire-image data in a current time period, a second type of image data being image data representing a difference between previous time-period image data and current time-period image data, the method comprising the steps of:
    transmitting image data from a transmission side to a reception side;
    notifying the transmission side of an error when it is detected on the reception side that received image data has an error;
    receiving, on the transmission side, notification of error occurrence, generating the first type of image data, and transmitting the generated first type of image data to the reception side;
    discarding the second type of image data prior to decoding, when the second type of image data is received at the reception side after the error occurrence and before the reception side receives the generated first type of image data from the transmission side; and
    receiving, on the reception side, the generated first type of image data from the transmission side, and decoding the received first type of image data.

2. The method as claimed in claim 1, wherein a cyclic redundancy check (CRC) and a sequential number of received image data are used to detect the error occurrence.

3. A method for transmitting image data in a mobile communication system, in which image data are classified into two types of image data, a first type of image data corresponding to entire-image data in a current time period, a second type of image data being image data representing a difference between previous time-period image data and current time-period image data, the method comprising the steps of:
    transmitting image data to a reception side and then receiving notification of error occurrence of the image data from the reception side;
    generating the first type of image data when receiving the notification of the error occurrence, and transmitting the generated first type of image data to the reception side; and
    wherein the second type of image data is discarded at the reception side prior to decoding, when the second type of image data is received at the reception side after the error occurrence and before the reception side receives the generated first type of image data from the transmission side.

4. The method as claimed in claim 3, wherein a cyclic redundancy check (CRC) and a sequential number of received image data are used to detect the error occurrence.

5. An apparatus for transmitting/receiving image data in a mobile communication system, in which image data are classified into two types of image data, a first type of image data corresponding to entire-image data in a current time period, a second type of image data being image data representing a difference between previous time-period image data and current time-period image data, the apparatus comprising:
    a transmission apparatus for transmitting image data, generating the first type of image data when notification of error occurrence is received, and transmitting the generated first type of image data to the reception apparatus; and
    a reception apparatus for receiving the image data, notifying the transmission apparatus of the error occurrence of a received image data when an error is detected in the received image data, and decoding the generated first type of image data when the generated first type of image data are received from the transmission apparatus;
    wherein the second type of image data is discarded at the reception side prior to decoding, when the second type of image data is received at the reception side after the error occurrence and before the reception side receives the generated first type of image data from the transmission side.

6. The apparatus as claimed in claim 5, wherein a cyclic redundancy check (CRC) and a sequential number of the received image data are used to detect the error occurrence.

* * * * *